US012572757B2

(12) United States Patent (10) Patent No.: US 12,572,757 B2

Zhang (45) Date of Patent: Mar. 10, 2026

(54) VIDEO PROCESSING METHOD, VIDEO PROCESSING APPARATUS, AND COMPUTER-READABLE STORAGE MEDIUM

(71) Applicant: BEIJING BYTEDANCE NETWORK TECHNOLOGY CO., LTD., Beijing (CN)

(72) Inventor: Yixiang Zhang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 401 days.

(21) Appl. No.: 17/726,728

(22) Filed: Apr. 22, 2022

(65) Prior Publication Data

US 2023/0169278 A1 Jun. 1, 2023

(30) Foreign Application Priority Data

Nov. 30, 2021 (CN) .......................... 202111447610.2

(51) Int. Cl.
*G06F 40/51* (2020.01)
*G06F 40/58* (2020.01)
(Continued)

(52) U.S. Cl.
CPC .............. *G06F 40/51* (2020.01); *G06F 40/58* (2020.01); *H04N 21/4856* (2013.01); *H04N 21/4884* (2013.01)

(58) Field of Classification Search
CPC .......... G06F 40/51; G06F 40/58; G06F 40/10; G06F 40/47; G06F 40/149;
(Continued)

(56) References Cited

U.S. PATENT DOCUMENTS 7,992,183 B1 * 8/2011 Harrenstien ........... G06Q 10/00
725/137
8,645,134 B1 2/2014 Harrenstien et al.
(Continued)

FOREIGN PATENT DOCUMENTS

CN 103167360 A 6/2013
CN 104378692 A 2/2015
(Continued)

OTHER PUBLICATIONS

Advisory Action issued on Oct. 25, 2023 in U.S. Appl. No. 17/726,642 (6 pages).
(Continued)

*Primary Examiner* — Leshui Zhang

(57) ABSTRACT

This disclosure relates to a video processing method, a video processing apparatus, and a computer-readable storage medium. The video processing method includes: providing a translator with a video to be translated, and providing, in-feed in the video, the translator with an interactive interface for translating an original caption in the video, on which a translation of the original caption is comprised; entering a proofreading page in response to an edit request of the translator for the translation; receiving a caption translation returned by the translator from the proofreading page; and displaying, in the video, a caption translation passing assessment.

19 Claims, 11 Drawing Sheets

(51) Int. Cl.

| | |
|---|---|
| *G11B 27/031* | (2006.01) |
| *H04N 21/431* | (2011.01) |
| *H04N 21/485* | (2011.01) |
| *H04N 21/488* | (2011.01) |
| *H04N 21/854* | (2011.01) |

(58) Field of Classification Search

CPC ............ G06F 16/9537; G06F 16/7837; G06F 17/289; G06F 16/70; G06F 3/0482; G06F 3/0484; G06F 3/04845; H04N 21/4856; H04N 21/485; H04N 21/4884; H04N 21/488; H04N 21/47217; H04N 21/472; H04N 21/854; H04N 21/4312; H04N 21/431; H04N 21/4788; H04N 21/478; H04N 21/4316; H04N 21/4394; H04N 21/2668; H04N 21/435; H04N 21/4826; H04N 21/4126; H04N 5/278; G11B 27/036; G11B 27/10; G11B 27/34; G11B 27/031; G11B 27/00; G11B 27/002; G11B 27/005; G11B 27/007; G11B 27/02; G11B 27/022; G11B 27/024; G11B 27/026; G11B 27/028; G11B 27/029; G11B 27/032; G11B 27/034; G11B 27/038; G11B 27/04; G11B 27/06; G06Q 30/0277; G06Q 30/02; G06Q 10/10

USPC .................................................. 704/2–5, 7–9

See application file for complete search history.

(56) References Cited

U.S. PATENT DOCUMENTS

| | | | |
|---|---|---|---|
| 8,756,050 | B1 | 6/2014 | Harkness et al. |
| 9,418,060 | B1 | 8/2016 | Winham et al. |
| 9,696,881 | B2 | 7/2017 | Pornprasitsakul et al. |
| 10,025,776 | B1 | 7/2018 | Sjoberg et al. |
| 2003/0090711 | A1 | 5/2003 | Yoshii et al. |
| 2006/0227240 | A1 | 10/2006 | Chiu et al. |
| 2007/0106516 | A1 | 5/2007 | Larson et al. |
| 2008/0129865 | A1 | 6/2008 | Leonard |
| 2010/0118189 | A1 | 5/2010 | Ayoub et al. |
| 2010/0138209 | A1 | 6/2010 | Harrenstien et al. |
| 2010/0310234 | A1 | 12/2010 | Sigvaldason |
| 2012/0054619 | A1 | 3/2012 | Spooner et al. |
| 2012/0275761 | A1 | 11/2012 | Li et al. |
| 2012/0316860 | A1 | 12/2012 | Reitan |
| 2013/0246040 | A1 | 9/2013 | DeLuca et al. |
| 2014/0142918 | A1 | 5/2014 | Dotterer et al. |
| 2014/0143218 | A1 | 5/2014 | Sanghavi et al. |
| 2014/0201631 | A1 | 7/2014 | Pornprasitsakul et al. |
| 2014/0303956 | A1 | 10/2014 | Wilson |
| 2015/0046148 | A1 | 2/2015 | Oh et al. |
| 2015/0134322 | A1 | 5/2015 | Cuthbert et al. |
| 2016/0147745 | A1 | 5/2016 | Park et al. |
| 2016/0342587 | A1 | 11/2016 | Bastide et al. |
| 2016/0350284 | A1 | 12/2016 | Yan et al. |

| | | | |
|---|---|---|---|
| 2016/0378748 | A1 | 12/2016 | Shoshan |
| 2017/0139904 | A1 | 5/2017 | Dakss et al. |
| 2017/0371869 | A1 | 12/2017 | Zhang et al. |
| 2018/0034961 | A1 | 2/2018 | Engelke et al. |
| 2018/0052833 | A1 | 2/2018 | Sarmenta |
| 2018/0143956 | A1 | 5/2018 | Skarbovsky et al. |
| 2018/0144747 | A1 | 5/2018 | Skarbovsky et al. |
| 2019/0104259 | A1* | 4/2019 | Angquist ............... G11B 27/34 |
| 2019/0379943 | A1 | 12/2019 | Ayala |
| 2021/0073341 | A1 | 3/2021 | Liu et al. |
| 2021/0073479 | A1 | 3/2021 | Yamada |
| 2021/0250660 | A1 | 8/2021 | Jiang et al. |
| 2021/0375324 | A1 | 12/2021 | Morton et al. |
| 2022/0383228 | A1 | 12/2022 | Lee et al. |

FOREIGN PATENT DOCUMENTS

| | | | |
|---|---|---|---|
| CN | 107688792 | A | 2/2018 |
| CN | 110276349 | A | 9/2019 |
| CN | 111898388 | A | 11/2020 |
| CN | 112104896 | A | 12/2020 |
| CN | 112954434 | A | 6/2021 |
| CN | 114143592 | A | 3/2022 |
| CN | 114143593 | A | 3/2022 |
| JP | 2009289091 | A | 12/2009 |
| JP | 2010-074482 | A | 4/2010 |
| JP | 2010157961 | A | 7/2010 |
| JP | 2013020559 | A | 1/2013 |
| JP | 2014-140135 | A | 7/2014 |
| JP | 2016509408 | A | 3/2016 |
| KR | 20160081032 | A | 7/2016 |
| KR | 20180006728 | A | 1/2018 |
| KR | 20180066398 | A | 6/2018 |
| KR | 20190141331 | A | 12/2019 |
| WO | 02/37841 | A1 | 5/2002 |
| WO | 2021057908 | A1 | 4/2021 |

OTHER PUBLICATIONS

Final Office Action issued on Aug. 3, 2023 in U.S. Appl. No. 17/726,642 (31 pages).

Nugroho et al., "Translation Course 4.0 Redefined: Enhancing Work Efficiency and Meaning Accuracy Using AEGISUB 3.2.2 Subtitling Software," 2019 International Seminar on Application for Technology of Information and Communication (iSemantic), 2019, pp. 548-553 (6 pages).

Zhao, Jian-hui, "Translation Strategies of Short Video Subtitle Metaphor from the Perspective of Contextual Adaptation," Journal of Hubei University of Education, vol. 38, No. 11, Nov. 2021, pp. 100-104, with English abstract (6 pages).

Non-Final Office Action issued Mar. 17, 2023 in U.S. Appl. No. 17/726,642.

Notice of Reasons for Refusal for Japanese Patent Application No. 2024-532477 dated Oct. 22, 2024, 10 pages.

Final Office Action mailed on Sep. 18, 2024, for U.S. Appl. No. 17/726,642, pp. 25.

Office action received from Japanese patent application No. 2024-532438 mailed on Aug. 12, 2025, 18 pages (9 pages English Translation and 9 pages Original Copy).

\* cited by examiner

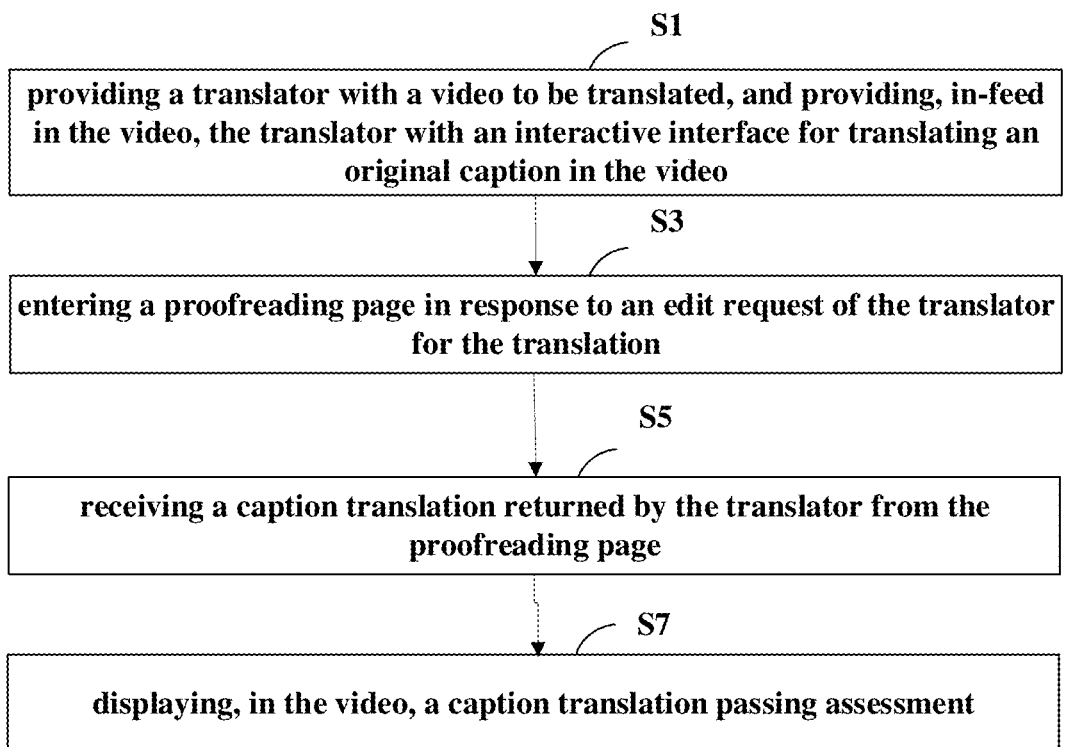

S1 providing a translator with a video to be translated, and providing, in-feed in the video, the translator with an interactive interface for translating an original caption in the video

S3 entering a proofreading page in response to an edit request of the translator for the translation

S5 receiving a caption translation returned by the translator from the proofreading page

S7 displaying, in the video, a caption translation passing assessment

Fig. 1

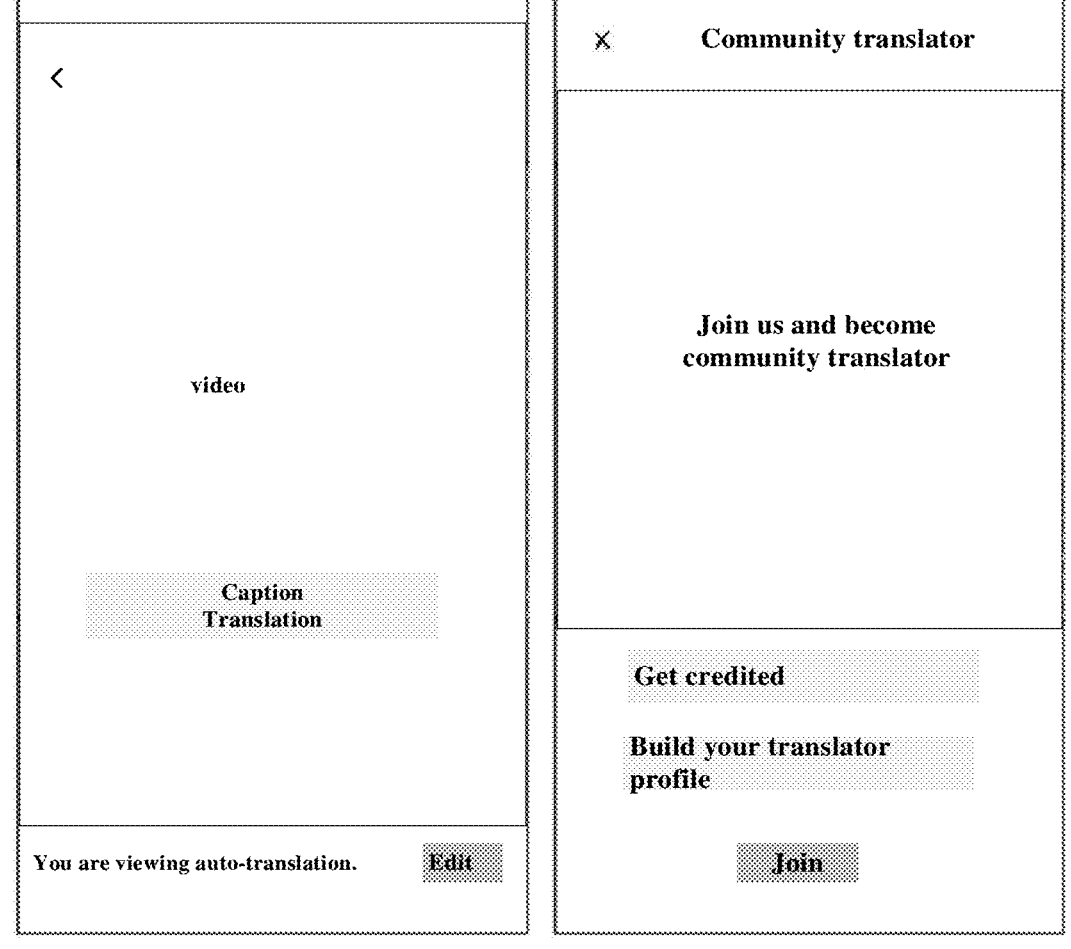
Fig. 2C                    Fig. 2D

VIDEO PROCESSING METHOD, VIDEO PROCESSING APPARATUS, AND COMPUTER-READABLE STORAGE MEDIUM

CROSS-REFERENCE TO RELATED APPLICATIONS

This application claims priority to Chinese Patent Application No. 202111447610.2, entitled "VIDEO PROCESS-ING METHOD, VIDEO PROCESSING APPARATUS, AND COMPUTER-READABLE STORAGE MEDIUM", and filed on Nov. 30, 2021. The entire disclosure of the prior application is hereby incorporated by reference in its entirety.

TECHNICAL FIELD

The present disclosure relates to the field of computer technologies, and in particular, to a video processing method, a video processing apparatus, and a computer-readable storage medium.

BACKGROUND

A social network can, according to an input of a user, provide various services, such as photo or video sharing, messaging, etc., to facilitate social interaction between users.

With the interaction with the social network, the user can upload digital media to a system for browsing by others. The digital media can include image, video, audio, text, and the like. For example, the user can post a self-created video onto the social network. The other users on the social network can interact with the video creator by means of browsing, likes, comments, and the like.

With the user's increasing dependence on the social network, the user has higher and higher requirements for experience of the social network, especially for quality of caption translation in the video.

SUMMARY

According to some embodiments of the present disclosure, there is provided a video processing method, comprising:

providing a translator with a video to be translated, and providing, in-feed in the video, the translator with an interactive interface for translating an original caption in the video, on which a translation of the original caption is comprised;

entering a proofreading page in response to an edit request of the translator for the translation;

receiving a caption translation returned by the translator from the proofreading page; and displaying, in the video, a caption translation passing assessment.

According to other embodiments of the present disclosure, there is provided a video processing apparatus, comprising:

a processor configured to provide a translator with a video to be translated, and provide, in-feed in the video, the translator with an interactive interface for translating an original caption in the video, on which a translation of the original caption is comprised;

enter a proofreading page in response to an edit request of the translator for the translation; and receive a caption translation returned by the translator from the proofreading page; and a display configured to display, in the video, a caption translation passing assessment.

According to still other embodiments of the present disclosure, there is provided a video processing apparatus, comprising:

a memory; and a processor coupled to the memory, the processor being configured to perform, based on instructions stored in the memory, one or more steps of the video processing method of any of the embodiments described in the present disclosure.

According to further embodiments of the present disclosure, there is provided a computer-readable storage medium having thereon stored a computer program which, when executed by a processor, performs one or more steps of the video processing method of any of the embodiments described in the present disclosure.

The "SUMMARY" is provided to introduce concepts in a simplified form, which will be described in detail below in the following "DETAILED DESCRIPTION OF THE DRAWINGS". The "SUMMARY" is not intended to identify key features or essential features of the claimed technical solutions, nor is it intended to limit the scope of the claimed technical solutions.

Other features, aspects, and advantages of the present disclosure will become apparent from the following detailed description of exemplary embodiments thereof, which is made with reference to the accompanying drawings.

BRIEF DESCRIPTION OF THE DRAWINGS

Preferred embodiments of the present disclosure are described below with reference to the accompanying drawings. The accompanying drawings described herein are used for providing a further understanding of the present disclosure. The accompanying drawings, together with the following specific description, are incorporated in and form a part of this specification, and serve to explain the present disclosure. It should be understood that the drawings in the following description relate to only some embodiments of the disclosure and do not constitute limitations on the present disclosure. In the drawings:

FIG. 1 illustrates a flow diagram of a video processing method according to some embodiments of the present disclosure;

FIGS. 2A to 2C illustrate schematic diagrams of interactive interfaces for translating an original caption in a video according to some embodiments of the present disclosure;

FIG. 2D illustrates a schematic diagram of guiding registration as a community translator according to some embodiments of the present disclosure;

Figures 2A, 2B:
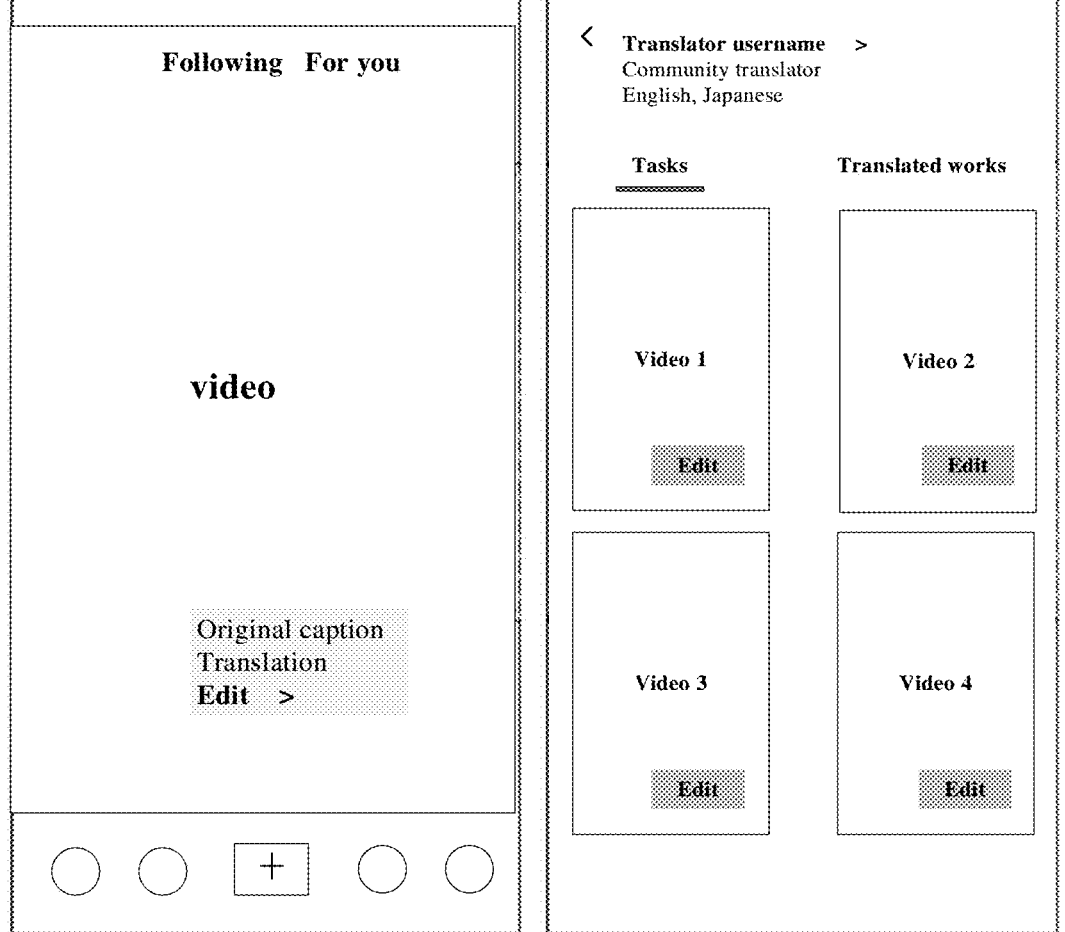

It should be understood that sizes of various components shown in the drawings are not necessarily drawn to actual scale for ease of description. Identical or similar reference numbers are used in the drawings to refer to identical or similar components. Therefore, once a certain item is defined in one drawing, it may not be further discussed in subsequent drawings.

DETAILED DESCRIPTION OF THE DRAWINGS

The technical solutions in the embodiments of the present disclosure will be described clearly and completely in conjunction with the drawings in the embodiments of the present disclosure, but it is obvious that the embodiments described are only some of the embodiments of the present disclosure, not all of the embodiments. The following description of the embodiments is merely illustrative in nature and is in no way intended to limit this disclosure, its application, or uses. It should be understood that the present disclosure can be implemented in various forms and should not be construed as limited to the embodiments set forth herein.

It should be understood that various steps recited in method embodiments of the present disclosure can be performed in a different order, and/or performed in parallel. Moreover, the method embodiments can comprise additional steps and/or omit performing the illustrated steps. The scope of the present disclosure is not limited in this respect. Unless specifically stated otherwise, relative arrangements of components and steps, numerical expressions, and numerical values set forth in these embodiments should be construed as merely illustrative, and not limiting the scope of the present disclosure.

A term "comprise" and variations thereof used in this disclosure are intended to be open-minded terms that comprise at least the following elements/features, but do not exclude other elements/features, i.e., "comprising but not limited to". Furthermore, a term "include" and variations thereof used in this disclosure are intended to be open-minded terms that include at least the following elements/features, but do not exclude other elements/features, i.e., "including but not limited to". Therefore, "comprise" is synonymous with "include". A term "based on" means "based at least in part on".

Throughout this specification, termed "one embodiment", "some embodiments", or "an embodiment" means that a specific feature, structure, or characteristic described in conjunction with the embodiments is comprised in at least one embodiment of the present invention. For example, the term "one embodiment" means "at least one embodiment"; the term "another embodiment" means "at least one other embodiment"; the term "some embodiments" means "at least some embodiments". Moreover, the phrases "in one embodiment", "in some embodiments", or "in an embodiment" appearing in various places throughout this specification do not necessarily all refer to a same embodiment, but they can also refer to the same embodiment.

It should be noted that notions of "first", "second", and the like, mentioned in the present disclosure, are only used for distinguishing different devices, modules or units, and are not used for limiting the order or interdependence of functions performed by the devices, modules or units. Unless otherwise specified, the notions of "first", "second", and the like, are not intended to imply that objects so described must be in a given order in time, space, rank, or any other way.

It should be noted that modifiers of "one" or "more" mentioned in this disclosure are intended to be illustrative rather than restrictive, and that those skilled in the art should appreciate that they should be understood as "one or more" unless otherwise clearly indicated in the context.

Names of messages or information exchanged between devices in the embodiments of the present disclosure are for illustrative purposes only, and are not intended to limit the scope of the messages or information.

The embodiments of the present disclosure will be described in detail below in conjunction with the accompanying drawings, but the present disclosure is not limited to these specific embodiments. These specific embodiments can be combined with each other below, and identical or similar concepts or processes may not be repeated in some embodiments. Furthermore, the specific feature, structure, or characteristic can be combined in any suitable manner that would be apparent to one of ordinary skill in the art from this disclosure in one or more embodiments.

It should be understood that in the present disclosure, there is also no limitation on how an image or video to be applied/processed is obtained. In one embodiment of the present disclosure, the image or video can be acquired from a storage device, such as an internal memory or an external storage device, and in another embodiment of the present disclosure, the image or video can be taken by a camera assembly. It should be noted that in the context of this specification, a type of the image or video is not specifically limited. Furthermore, the image or video can be a source image or video obtained by a camera device, or an image or video that is obtained by particularly processing the source image or video, such as preliminary filtering, antialiasing, color adjustment, contrast adjustment, normalization, and the like. It should be noted that the preprocessing operation can also comprise other types of preprocessing operations known in the art, which will not be described in detail herein.

With the user's increasing dependence on a social network, the user has higher and higher requirements for experience of the social network, especially for quality of caption translation in the video. In the related art, only a video poster can edit and post caption information of the video. To further improve the quality of the caption translation in the video, the caption translation in the video is provided using crowd-sourcing translation.

FIG. 1 illustrates a flow diagram of a video processing method according to some embodiments of the present disclosure.

As shown in FIG. 1, the video processing method comprises: step S1, providing a translator with a video to be translated, and providing, in-feed in the video, the translator with an interactive interface for translating an original caption in the video, on which a translation of the original caption is comprised; step S3, entering a proofreading page in response to an edit request of the translator for the translation; step S5, receiving a caption translation returned by the translator from the proofreading page; and step S7, displaying, in the video, a caption translation passing assessment.

In the step S1, the translator can be provided with the video to be translated according to at least one of a type of videos in which the translator is interested, or a language used by the translator on the social network.

In some embodiments, expected interest values of a translator for different types of videos can be determined according to history behavior data of the translator; the type of the videos in which the translator is interested is determined according to the expected interest values of the translator for the different types of videos; and the translator is provided with a video to be translated of a type matching the type of the videos in which the translator is interested. Providing the translator with videos of his/her favorite type can improve the translation enthusiasm of the translator, and is also beneficial to improving the quality of the translation and reducing the cost of translation assessment.

The language used by the translator can comprise at least one of: a system language used by the translator, a video language browsed by the translator, or a language inputted by the translator. For example, if in the system language used by the translator, the video language browsed by the translator, and the language inputted by the translator, English and Chinese are comprised, the translator can be provided with a video to be translated for which an original caption of the video is English or Chinese and desired to be translated into Chinese or English. Providing the translator with the video to be translated for which the languages of the original caption and translation match his/her used languages can more effectively improve the quality of the translation and the efficiency of the translation assessment.

The step S1 will be further described below in conjunction with FIGS. 2A to 2D. FIGS. 2A to 2C illustrate schematic diagrams of interactive interfaces for translating an original caption in a video according to some embodiments of the present disclosure. FIG. 2D illustrates a schematic diagram of guiding registration as a community translator according to some embodiments of the present disclosure.

FIG. 2A illustrates a video playing page and corresponding captions comprising an original caption and translation. FIG. 2A also illustrates an Edit option for the caption translation. The interactive interface comprising the Edit option is not provided to other users than the translator. The translator clicks on the Edit option and can enter a proofreading page. In some embodiments, for a community translator, the Edit option is always displayed; and for a non-community translator, if the translator does not click on the Edit option, it is displayed only a specified number of times, for example, 5 times.

The translator can also enter the interactive interface for translating the original caption in the video through a translation management interface. In some embodiments, the providing the translator with an interactive interface for translating the original caption in the video comprises: providing the translator with the translation management interface, the translation management interface having thereon displayed a thumbnail of the video to be translated, on which an option of editing the translation is provided.

FIG. 2B illustrates a schematic diagram of a translation management interface according to some embodiments of the present disclosure. FIG. 2B illustrates an identity of the translator, for example, whether he belongs to a community translator, a language he is good at. As shown in FIG. 2B, in a "Tasks" bar, there are displayed thumbnails (for example, video covers) of a plurality of videos to be translated, on which the option of editing the translation is provided, respectively. If the translator clicks on the Edit option, the proofreading page can be entered.

Of course, the translator can also click on the thumbnail of the video to be translated to enter a preview page. In other embodiments, the providing the translator with an interactive interface for translating the original caption in the video comprises: in response to a preview request of the translator for the video to be translated, entering the preview page, on which the video is played and the translation of the caption is displayed, and the option of editing the translation is provided.

FIG. 2C illustrates a schematic diagram of a preview page according to some embodiments of the present disclosure. As shown in FIG. 2C, on the preview page, there are displayed the playing page of the video and the corresponding caption translation, and can also be displayed the original caption. At a bottom of the preview page, there is a tip that the translator is viewing the translation, for example, an automatically translated machine translation, and the Editing option is provided. If the translator clicks on the Edit option, the proofreading page can be entered.

The translator can be an already registered community translator, or can be an unregistered translator. For the unregistered translator, the translator can also be provided with guidance on registration as the community translator. If he becomes the community translator, he can get corresponding certification. In some embodiments, the providing, in the video, the translator with an interactive interface for translating an original caption in the video further comprises providing the translator with the guidance on registration as the community translator, as shown in FIG. 2D.

Figures 3A, 3B:
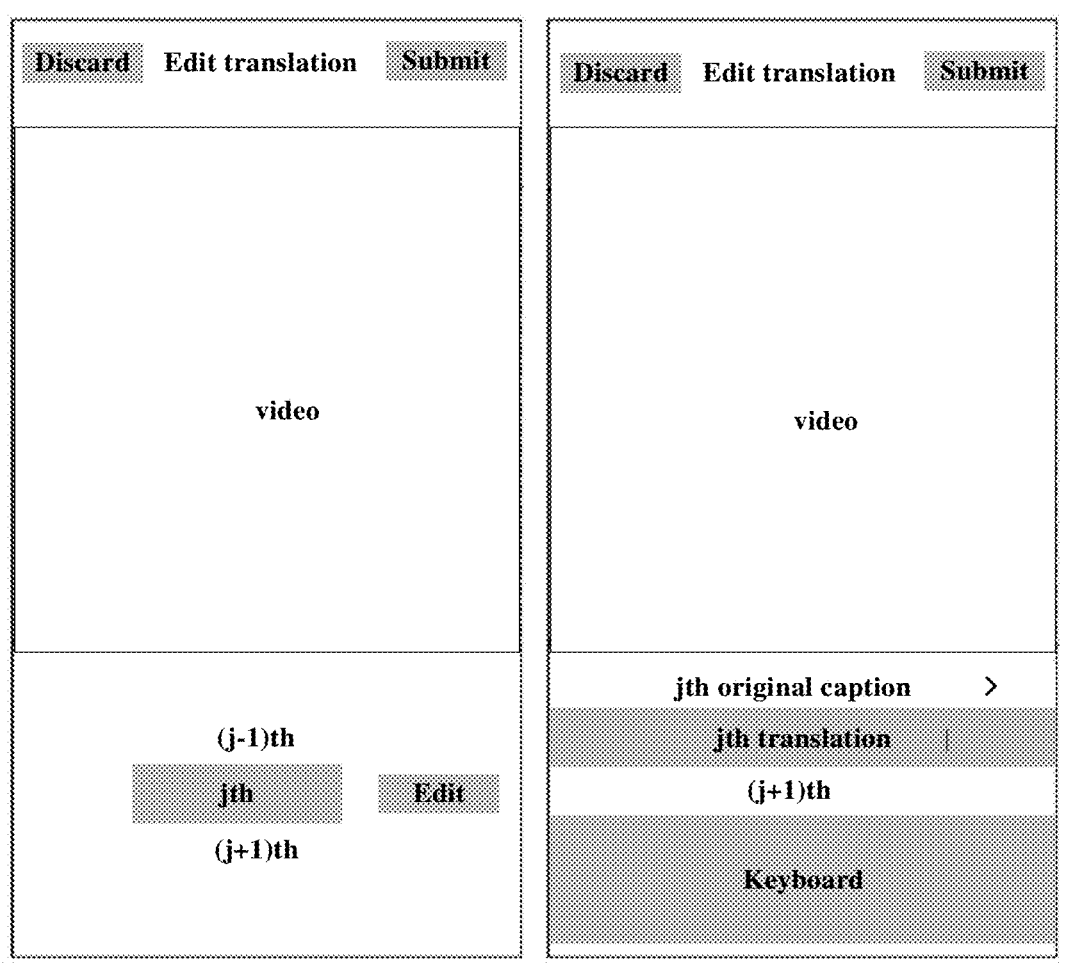
FIGS. 3A to 3B illustrate schematic diagrams of proofreading pages according to some embodiments of the present disclosure.
Figures 3C, 3D:
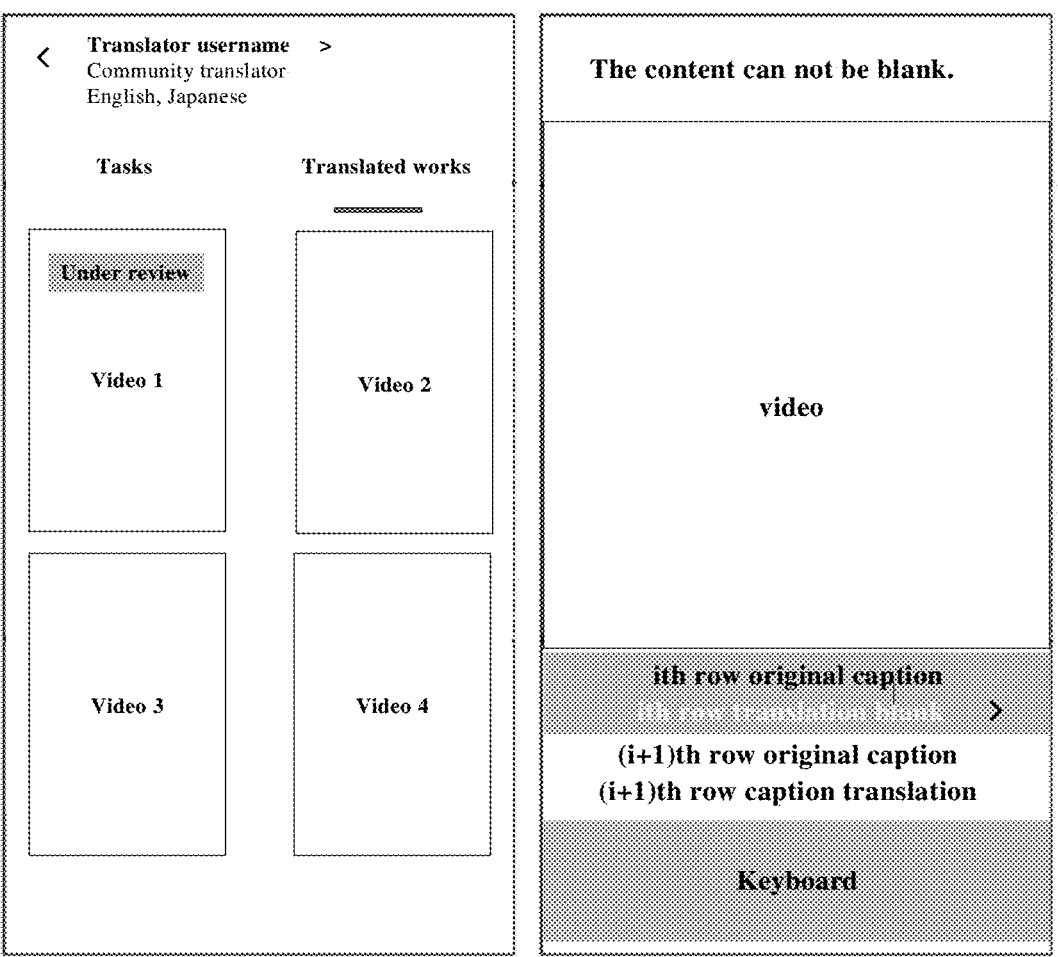
FIG. 3C illustrates a schematic diagram of a translation management interface according to other embodiments of the present disclosure.
FIG. 3D illustrates a schematic diagram of a proofreading page according to other embodiments of the present disclosure.
Figure 3E:
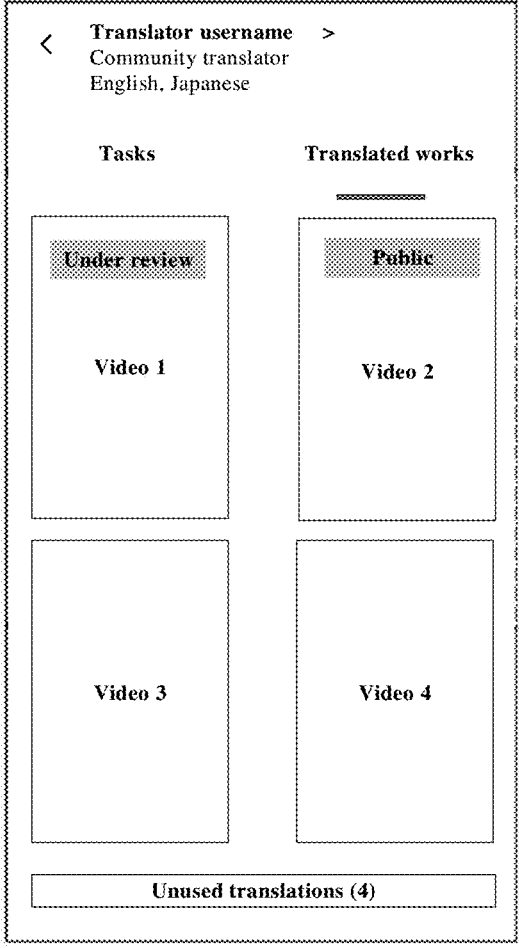
FIG. 3E illustrates a schematic diagram of a translation management interface according to still other embodiments of the present disclosure.

The step S3 will be further described below in conjunction with FIGS. 3A to 3D. FIGS. 3A to 3B illustrate schematic diagrams of proofreading pages according to some embodiments of the present disclosure. FIG. 3C illustrates a schematic diagram of a translation management interface according to other embodiments of the present disclosure. FIG. 3D illustrates a schematic diagram of a proofreading page according to other embodiments of the present disclosure. FIG. 3E illustrates a schematic diagram of a translation management interface according to still other embodiments of the present disclosure.

In the step S3, the proofreading page is entered in response to the edit request of the translator for the translation. After the translator enters the proofreading page, playing the video can be stopped, and an interface for editing the translation is provided. For example, after the translator enters the proofreading page, translations of a plurality of captions are displayed, and the caption translations are highlighted one by one. In FIG. 3A, on the proofreading page, there are displayed original captions one by one (for example, sentence by sentence), and below each original caption, there is displayed a translation, an edit location being positioned at a caption translation selected by the translator. The translation can be a machine translation or a caption translation provided by another translator.

In some embodiments, the video is played in synchronization with the caption in response to a playing request of the translator for the video. For example, the video can be played synchronously in a manner that a speech is consistent with the caption according to timestamps of the speech and the caption. The translator can scroll the caption translation, and the playing of the video can be continued. Of course, the translator can also choose to pause the playing of the video. In other embodiments, a corresponding speech is played in response to the translator clicking on a designated area of the original caption. The designated area of the original caption can comprise an original area and a corresponding icon area following the original.

FIG. 3B illustrates an edit interface after the translator is positioned on editing a jth caption translation shown in FIG. 3A. As shown in FIG. 3B, the edit interface can comprise a pop-up keyboard. The translator can clear the translation and input his/her own caption translation. In a process of editing the translation, the translator can click on a playing button of the video at any time to play the video. The translator can also click on the original caption area to play only the corresponding speech without playing the video.

As shown in FIG. 3B, the translator can click on a "Discard" button to discard already edited content; and if he has not yet edited content, he can go back to the preview page directly. When the translator has had the edited content, a "Submit" button can be clicked. When the translator clicks on the "Submit" button, a dialog box can also pop up to provide an option of whether another translation task is initiated after the caption translation is submitted. If this option is selected, a next translation task is entered directly. If the option is not selected, the translator's translation management interface can be entered.

If the caption translation is successfully submitted, there is a message to prompt that the translation has been submitted. The submitted translation will be displayed in a tab of a "Translation works" bar in the translation management interface of the translator and tagged as "under review".

FIG. 3C illustrates a schematic diagram of a translation management interface according to other embodiments of the present disclosure. Similar to FIG. 2B, FIG. 3C also illustrates the identity of the translator, for example, whether he belongs to a community translator, a language he is good at. As shown in FIG. 3C, in "Translation works", there are displayed a plurality of thumbnails (for example, video covers) of translation works completed by the translator, and on the thumbnail of the video to be translated, there is displayed a current status of the caption translation, for example, "under review".

If the caption translation is not successfully submitted, for example, part of the caption translation has been already cleared, but corresponding caption translation has not been inputted by the translator yet, that is, if at least one row of blank is present in the text, there is a message to prompt the translator that any row cannot be left blank, and the translator is guided for positioning at a 1st blank row for editing, as shown in FIG. 3D.

The caption translation of the translator is submitted to a platform, and after it passes assessment, a notification of the platform will be received. That is, the video processing method further comprises: sending a notification to the translator after the caption translation of the translator passes assessment. Of course, the translator can also enter the corresponding task management interface to view the status of the caption translation, which is, for example, under review, already posted, and not passing assessment (unused translation), etc., as shown in FIG. 3E.

For an unused translation, considering the huge extra workload of server-side storage of the unused translation, the unused translation can also be not displayed, but a list will still be kept and an initial translation will be displayed.

For example, for one same video X, a translation of a translator A is not used, and a translation of a translator B is used. The video X will appear in an "Unused translations" list of the translator A, where only an initial translation, rather than the translation of the translator B, is displayed. The video X will appear in the "Translation works" tab of the translator B, where the translation of the translator B is displayed.

In some embodiments, for the translation management interface, when the translator A begins editing the video X, the video X is deleted from a "Tasks"-bar list of other translators. For a special case, when the "Tasks"-bar list of the translator B is not refreshed in time and the translator also plans to edit the video X, the translator B will be prompted and provided with an option of shifting to a translation task page of another available video. In this way, an unnecessary task conflict can be avoided, and the overall efficiency of the crowdsourcing translation is improved.

Figure 4A:
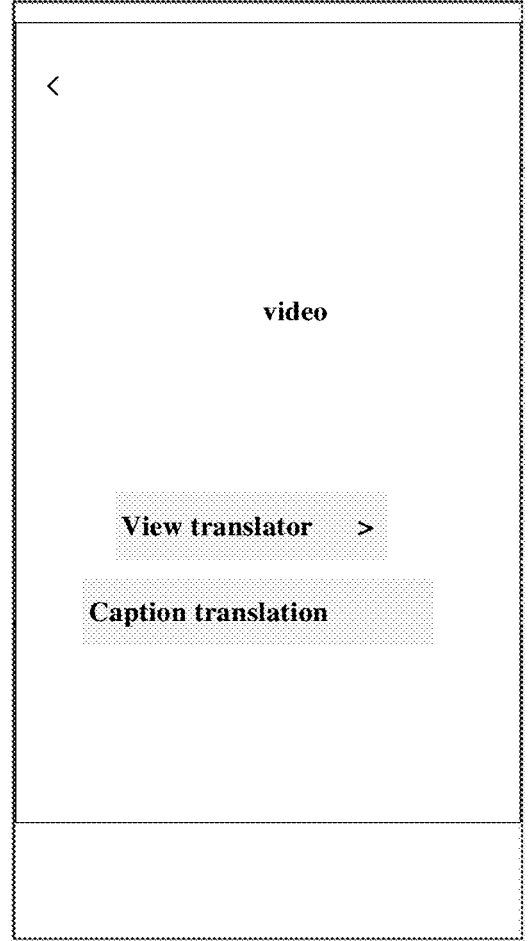
FIG. 4A illustrates a schematic diagram of a caption translation viewing page according to some embodiments of the present disclosure.
Figure 4B:
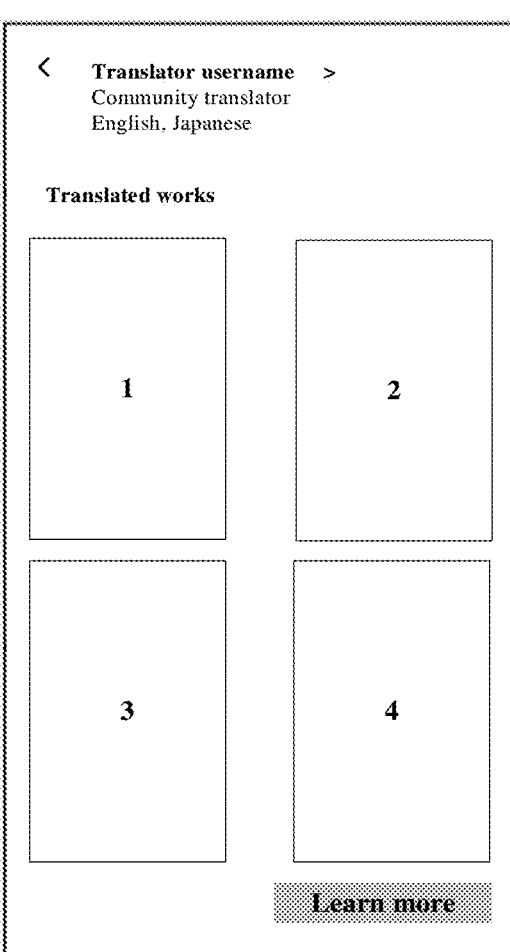
FIG. 4B illustrates a schematic diagram of a translator information page according to some embodiments of the present disclosure.
Figure 5A:
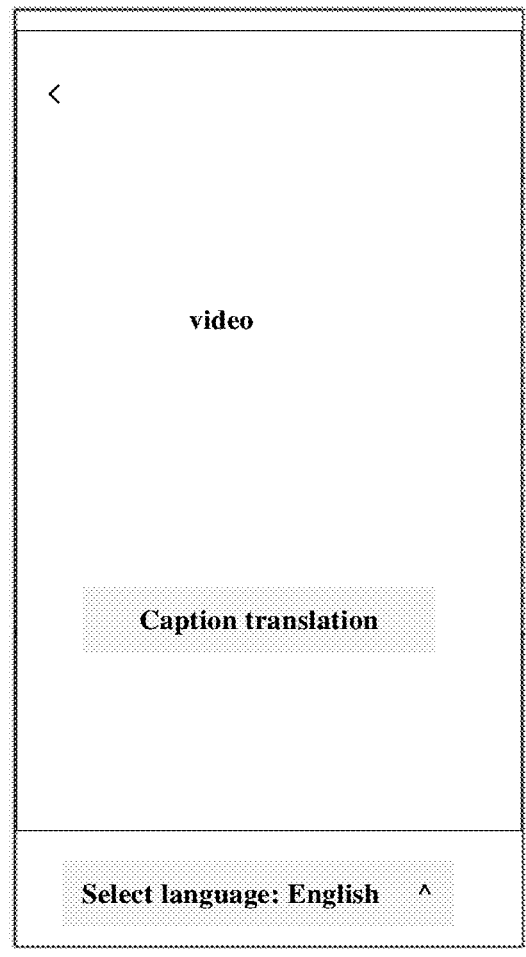
FIG. 5A illustrates a schematic diagram of a video playing page according to some embodiments of the present disclosure.
Figure 5B:
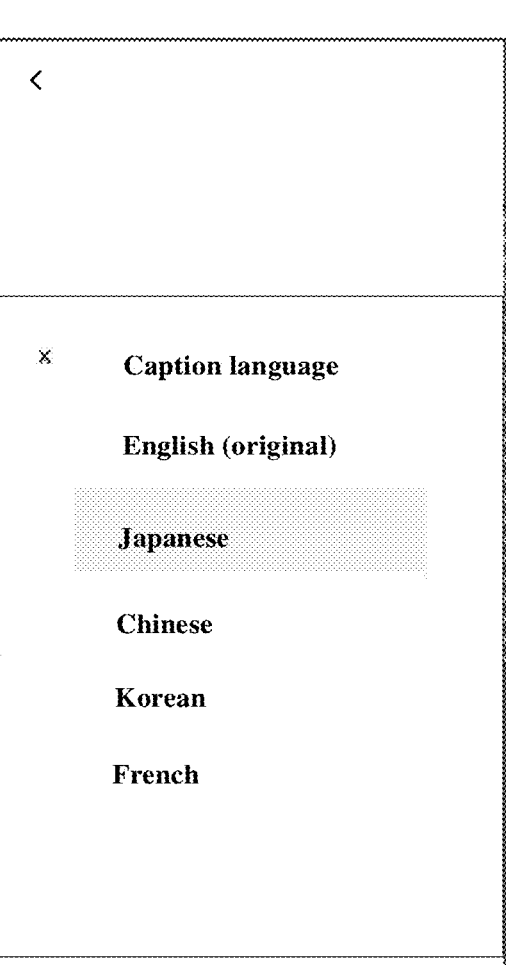
FIG. 5B illustrates a schematic diagram of a caption language management page according to some embodiments of the present disclosure.
Figure 5C:
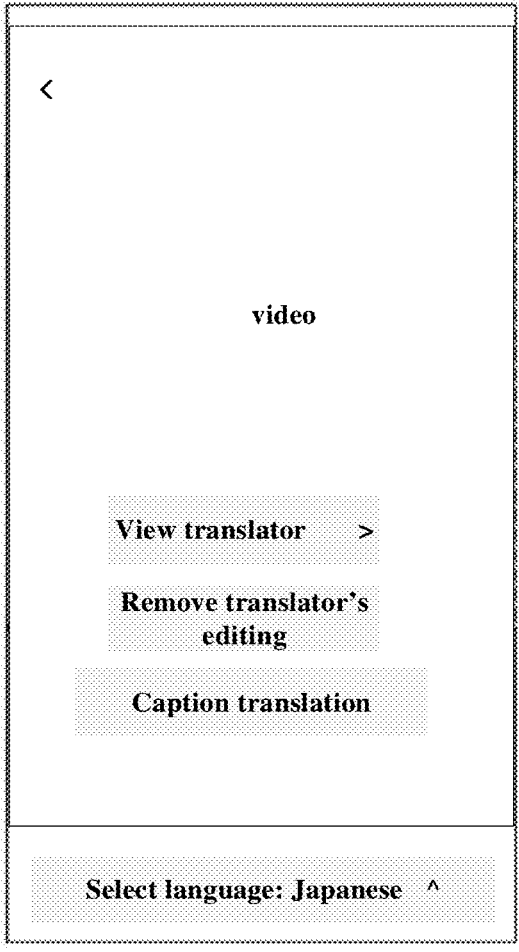
FIG. 5C illustrates a schematic diagram of a caption translation viewing page according to other embodiments of the present disclosure.

The step S5 will be described below in conjunction with FIGS. 4A to 5C. FIG. 4A illustrates a schematic diagram of a caption translation viewing page according to some embodiments of the present disclosure. FIG. 4B illustrates a schematic diagram of a translator information page according to some embodiments of the present disclosure. FIG. 5A illustrates a schematic diagram of a video playing page according to some embodiments of the present disclosure. FIG. 5B illustrates a schematic diagram of a caption language management page according to some embodiments of the present disclosure. FIG. 5C illustrates a schematic diagram of a caption translation viewing page according to other embodiments of the present disclosure.

In the step S5, the caption translation returned by the translator from the interactive page is received and reviewed. In some embodiments, the creator of the video can also be notified that he/she has had a caption translation passing assessment. The creator of the video can view the caption translation according to a path provided by the notification, such as the caption translation viewing page shown in FIG. 4A. The creator of the video can also enter the translator information page to view and know relevant information of the translator by clicking on the "View translator" button shown in FIG. 4A, as shown in FIG. 4B.

The creator of the video can also jump to the video playing page by clicking on the video, as shown in FIG. 5A. In FIG. 5A, on the video playing page, there is displayed the original caption by default, but is provided a language option. After clicking the language option, the caption language management page is entered, as shown in FIG. 5B. In FIG. 5B, a language of the original caption is presented, as well as languages of various versions of caption translations. The creator of the video can select a caption translation in a corresponding language and view a corresponding caption translation, as shown in FIG. 5C. Similar to FIG. 4A, FIG. 5C illustrates the caption translation, and displays the "View translator" button. As described above, the creator of the video can also click on the "View translator" button shown in FIG. 5C, and enter the translator information page to view and know the relevant information of the translator, as shown in FIG. 4B. The creator of the video can also remove the caption translation of the translator through a "Remove translator's editing" button shown in FIG. 5C. A caption translation adopted by the creator of the video will be posted.

Figures 6A, 6B:
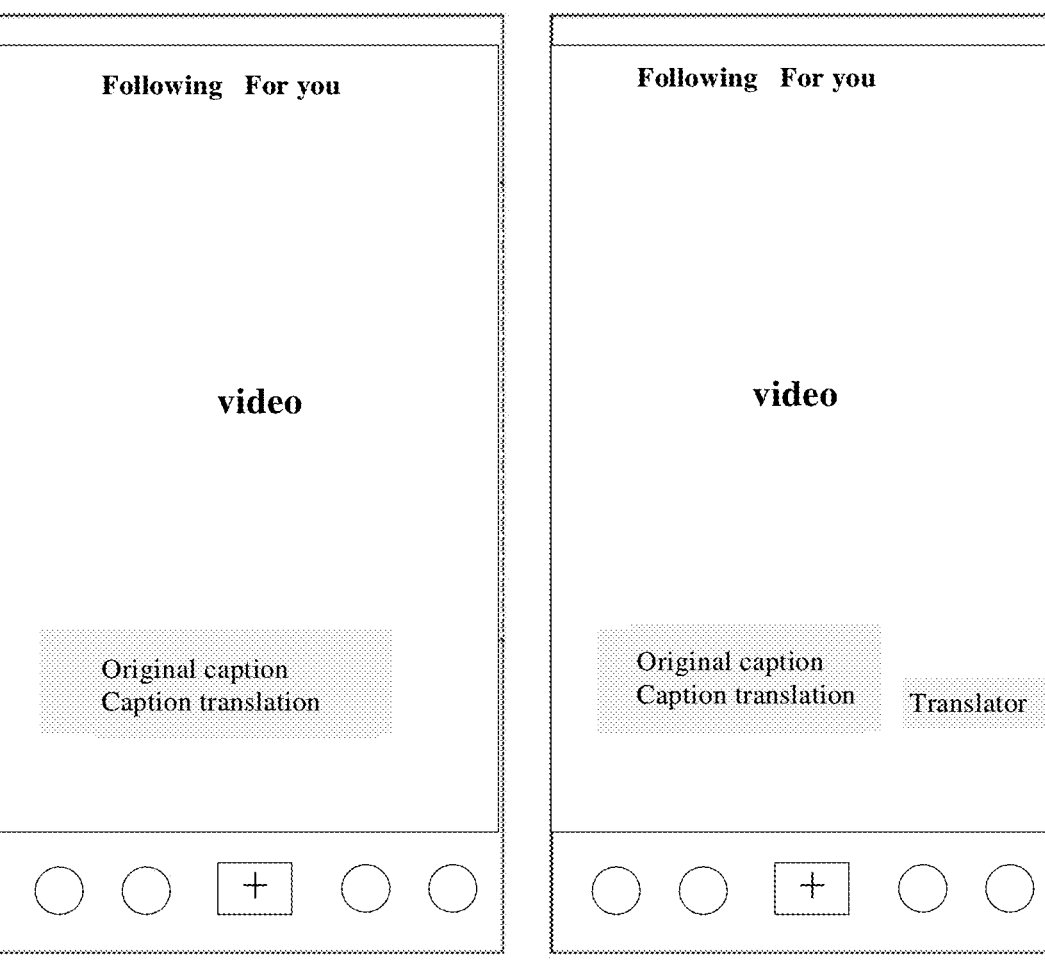
FIG. 6A illustrates a schematic diagram of a video playing page according to other embodiments of the present disclosure.
FIG. 6B illustrates a schematic diagram of with the translator an interactive interface for interaction with a viewer according to some embodiments of the present disclosure.

The step S7 will be described below in conjunction with FIGS. 6A to 6B. FIG. 6A illustrates a schematic diagram of a video playing page according to other embodiments of the present disclosure. FIG. 6B illustrates a schematic diagram of with the translator an interactive interface for interaction with a viewer according to some embodiments of the present disclosure.

In the step S7, the caption translation passing assessment is displayed in the video. As shown in FIG. 6A, the original caption of the video and the posted caption translation are synchronized with the speech of the video.

In some embodiments, the video processing method further comprises: providing, in the video, the interactive interface for the translator's interaction with the viewer, as shown in FIG. 6B. In FIG. 6B, in the video, there is displayed the caption translation passing assessment, and is displayed a signature of the translator corresponding to the caption translation, for example, a username of the translator. The viewer can perform interaction such as likes, etc., for the translator shown in FIG. 6B.

In the above embodiments, a complete solution is provided for the crowdsourcing translation of the video, and particularly, a more convenient and efficient translation interactive interface is provided for the translator. In addition, through the crowdsourcing translation of the embodiments of the present disclosure, the quality of the translation and the efficiency of translation assessment can be effectively improved.

Figure 7:
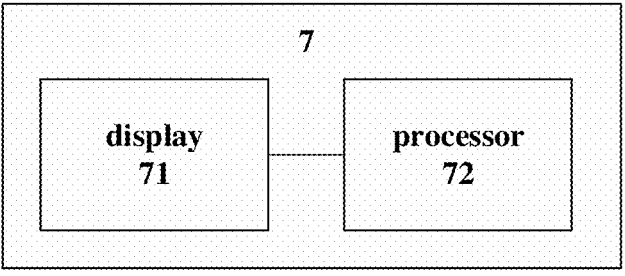
FIG. 7 illustrates a block diagram of a video processing apparatus according to some embodiments of the present disclosure.

FIG. 7 illustrates a block diagram of a video processing apparatus according to some embodiments of the present disclosure. As shown in FIG. 7, a video processing apparatus 7 comprises a processor 71 and a display 72.

The processor 71 is configured to: provide a translator with a video to be translated, and provide, in-feed in the video, the translator with an interactive interface for translating an original caption in the video, on which a translation of the original caption is comprised; enter a proofreading page in response to an edit request of the translator for the translation; and receive the caption translation returned by the translator from the interactive page. For example, the processor 71 is configured to perform the steps S1 to S5.

The display 72 is configured to display, in the video, a caption translation passing assessment, for example, perform the step S7.

Furthermore, although not shown, the apparatus can also comprise a memory that can have thereon stored various information generated in operations by the video processing apparatus and the units included in the video processing apparatus, programs and data for the operations, and the like. The memory can be a volatile memory and/or non-volatile memory. For example, the memory can comprise, but is not limited to, a random access memory (RAM), dynamic random access memory (DRAM), static random access memory (SRAM), read-only memory (ROM), flash memory. Of course, the memory can also be located outside the video processing apparatus.

Figure 8:
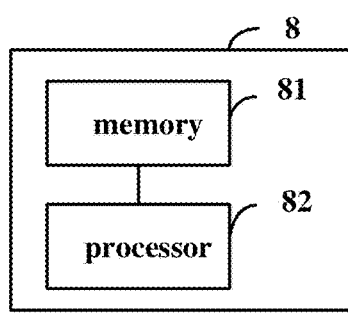
FIG. 8 illustrates a block diagram of a video processing apparatus according to other embodiments of the present disclosure.

FIG. 8 illustrates a block diagram of a video processing apparatus according to other embodiments of the present disclosure.

In some embodiments, a video processing apparatus 8 can be various types of devices, which can comprise, for example, but are not limited to, mobile terminals such as a mobile phone, a notebook computer, a digital broadcast receiver, a PDA (Personal Digital Assistant), a PAD (Tablet Personal Computer), a PMP (Portable Multimedia Player), a vehicle-mounted terminal (for example, a vehicle-mounted navigation terminal), and the like, and fixed terminals such as a digital TV, a desktop computer, and the like.

As shown in FIG. 8, the video processing apparatus 8 comprises: a memory 81 and a processor 82 coupled to the memory 81. It should be noted that the components of the video processing apparatus 8 shown in FIG. 8 are only exemplary and not restrictive, and the video processing apparatus 8 can also have other components according to practical application needs. The processor 82 can control the other components in the video processing apparatus 8 to perform a desired function.

In some embodiments, the memory 81 is configured to store one or more computer-readable instructions. The processor 82 is configured to execute computer-readable instructions which, when executed by the processor 82, implement the method according to any of the embodiments described above. For specific implementations of steps of the method and related explanations, reference can be made to the above embodiments, which are not repeated herein.

For example, the processor 82 and the memory 81 can be indirect or indirect communication with each other. For example, the processor 82 and the memory 81 can communicate over a network. The network can comprise a wireless network, a wired network, and/or any combination of wireless and wired networks. The processor 82 and the memory 81 can also communicate with each other through a system bus, which is not limited in the present disclosure.

For example, the processor 82 can be embodied as various suitable processors, processing devices, and the like, such as a central processing unit (CPU), graphics processing unit (GPU), network processor (NP), and the like; and can also be a digital signal processor (DSP), application specific integrated circuit (ASIC), field programmable gate array (FPGA) or other programmable logic device, discrete gate or transistor logic, discrete hardware component. The central processing unit (CPU) can be an X86 or ARM architecture, etc. For example, the memory 81 can comprise any combination of various forms of computer-readable storage media, such as a volatile memory and/or non-volatile memory. The memory 81 can comprise, for example, a system memory that has thereon stored, for example, an operating system, application program, boot loader, database, and other program. Various application programs and various data and the like can also be stored in the storage medium.

Figure 9:
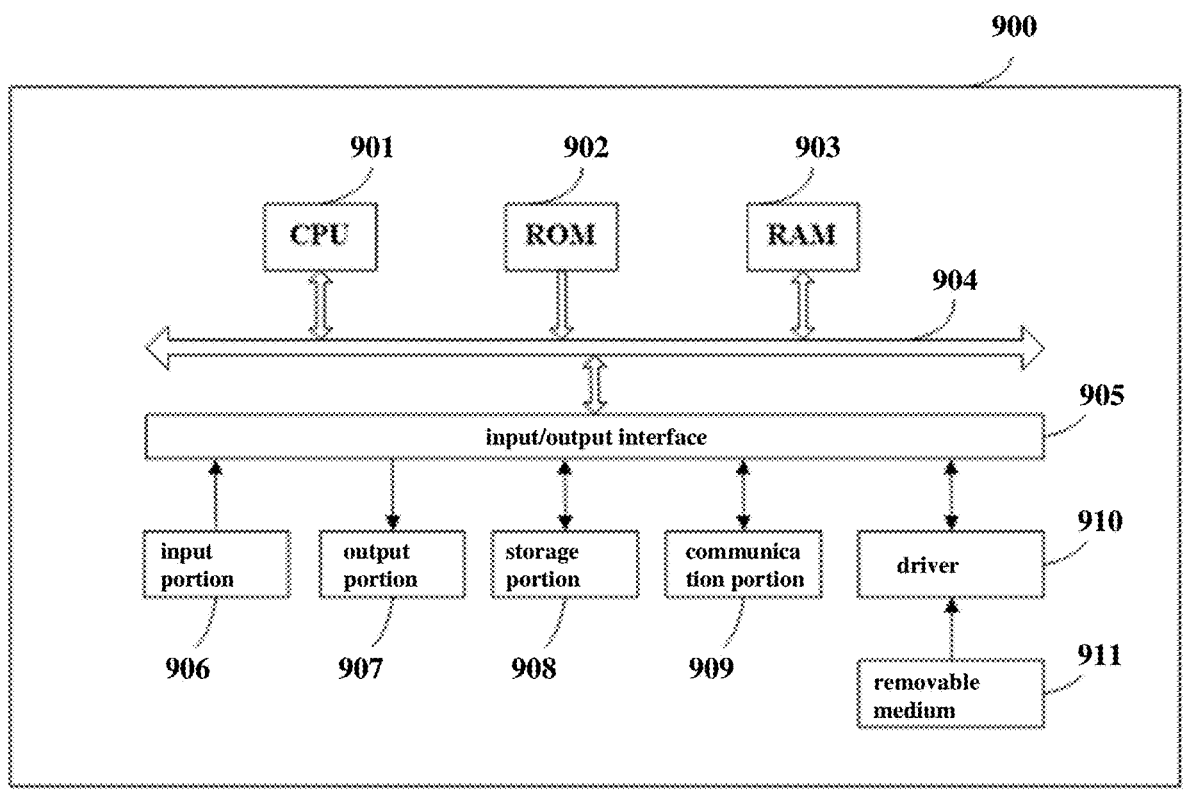
FIG. 9 illustrates a block diagram of an electronic device according to some embodiments of the present disclosure.

In addition, according to some embodiments of the present disclosure, in the case where various operations/processing according to the present disclosure are implemented by software and/or firmware, a program constituting the software can be installed from the storage medium or network to a computer system having a dedicated hardware structure, for example, a computer system of an electronic device 900 shown in FIG. 9, which when the various programs are installed, is capable of performing various functions comprising functions such as those described above and the like.

In FIG. 9, a central processing unit (CPU) 901 performs various processing according to a program stored in a read-only memory (ROM) 902 or a program loaded from a storage portion 908 to a random access memory (RAM) 903. In the RAM 903, data needed when the CPU 901 performs various processing and the like is also stored as needed. The central processing unit is merely exemplary, which can also be other types of processors such as the various processors described above. The ROM 902, RAM 903, and storage portion 908 can be various forms of computer-readable storage media, as described below. It should be noted that although the ROM 902, RAM 903, and storage portion 908 are shown separately in FIG. 9, one or more of them can be combined or located in a same memory or storage module, or different memories or storage modules.

The CPU 901, ROM 902, and RAM 903 are connected to each other via a bus 904. An input/output interface 905 is also connected to the bus 904.

The following components are connected to the input/output interface 905: an input portion 906 such as a touch screen, a touch pad, a keyboard, a mouse, an image sensor, a microphone, an accelerometer, a gyroscope, and the like; an output portion 907, comprising a display such as a cathode ray tube (CRT), a liquid crystal display (LCD), a speaker, a vibrator, and the like; the storage portion 908, comprising a hard disk, a magnetic tape, and the like; and a communication portion 909, comprising a network interface card such as a LAN card, a modem, and the like. The communication portion 909 allows communication processing to be performed via a network such as the Internet. It is readily appreciated that while the various devices or modules in the electronic device 900 shown in FIG. 9 communicate via the bus 904, they can also communicate through a network or other manners, wherein the network can comprise a wireless network, a wired network, and/or any combination of wireless and wired networks.

A driver 910 is also connected to the input/output interface 905 as needed. A removable medium 911 such as a magnetic disk, an optical disk, a magneto-optical disk, a semiconductor memory, or the like is mounted on the drive 910 as needed, so that a computer program read out therefrom is installed in the storage portion 908 as needed.

In the case where the series of processing described above is implemented by software, a program constituting the software can be installed from a network such as the Internet or a storage medium such as the removable medium 911.

According to an embodiment of the present disclosure, a process described above with reference to a flow diagram can be implemented as a computer software program. For example, in the embodiment of the present disclosure, a computer program product is comprised, which comprises a computer program carried on a computer-readable medium, the computer program comprising program code for performing the method illustrated by the flow diagram. In such an embodiment, the computer program can be downloaded and installed from a network through the communication device 909, or installed from the storage portion 908, or installed from the ROM 902. The computer program, when executed by the CPU 901, performs the above functions defined in the method of the embodiment of the present disclosure.

It should be noted that, in the context of this disclosure, a computer-readable medium can be any tangible medium that can have thereon contained or stored a program for use by or in conjunction with an instruction execution system, apparatus, or device. The computer-readable medium can be a computer-readable signal medium or a computer-readable storage medium or any combination of the two. The computer-readable storage medium can be, for example, but is not limited to: an electronic, magnetic, optical, electromagnetic, infrared, or semiconductor system, apparatus, or device, or any combination of the above. More specific examples of the computer-readable storage medium can comprise, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above. In the present disclosure, the computer-readable storage medium can be any tangible medium that can have thereon contained or stored a program for use by or in conjunction with an instruction execution system, apparatus, or device. However, in the present disclosure, the computer-readable signal medium can comprise a data signal propagated in baseband or as part of a carrier wave, in which computer-readable program code is carried. Such a propagated data signal can take any of a variety of forms, comprising but not limited to, an electromagnetic signal, an optical signal, or any suitable combination of the above. The computer-readable signal medium can also be any computer-readable medium other than the computer-readable storage medium, which can send, propagate, or transmit a program for use by or in conjunction with an instruction execution system, apparatus, or device. Program code comprised on the computer-readable medium can be transmitted using any suitable medium, comprising but not limited to: a wire, optical cable, RF (radio frequency), etc., or any suitable combination of the above.

The above computer-readable medium can be comprised in the electronic device; or can be separate without being assembled into the electronic device.

In some embodiments, there is also provided a computer program, comprising: instructions which, when executed by a processor, cause the processor to perform the method of any of the embodiments described above. For example, the instructions can be embodied as computer program code.

In an embodiment of the present disclosure, computer program code for performing operations of the present disclosure can be written in one or more programming languages or any combination thereof, wherein the programming language comprises but is not limited to an object-oriented programming language such as Java, Smalltalk, C++, and also comprises a conventional procedural programming language, such as a "C" programming language or similar programming language. The program code can be executed entirely on a user's computer, partly on the user's computer, as a stand-alone software package, partly on the user's computer and partly on a remote computer or entirely on the remote computer or server. In the scenario where the remote computer is involved, the remote computer can be connected to the user's computer through any type of network, which comprises a local area network (LAN) or a wide area network (WAN), or can be connected to an external computer (for example, through the Internet using an Internet service provider).

Flow diagrams and block diagrams in the drawings illustrate the possible architecture, functions, and operations of systems, methods and computer program products according to various embodiments of the present disclosure. In this regard, each block in the flow diagrams or block diagrams can represent one module, program segment, or portion of code, which comprises one or more executable instructions for implementing a specified logic function. It should also be noted that, in some alternative implementations, functions noted in the blocks can occur in a different order from the order noted in the drawings. For example, two blocks shown in succession can, in fact, be executed substantially in parallel, or the blocks can sometimes be executed in a reverse order, which depends upon functions involved. It will also be noted that each block of the block diagrams and/or flow diagrams, and a combination of blocks in the block diagrams and/or flow diagrams, can be implemented by a special-purpose hardware-based system that performs the specified function or operation, or a combination of special-purpose hardware and computer instructions.

A module, component or unit involved in the description of the embodiment of the present disclosure can be implemented by software or hardware. A name of the module, component, or unit does not in some cases constitute a limitation on the module, component, or unit itself.

The functions described herein above can be performed, at least in part, by one or more hardware logic components. For example, without limitation, an exemplary hardware logic component that can be used comprises: a field programmable gate array (FPGA), application specific integrated circuit (ASIC), application specific standard product (ASSP), system on chip (SOC), complex programmable logic device (CPLD), and the like.

The above description is only some embodiments of the present disclosure and explanations of technical principles employed. It should be appreciated by those skilled in the art that the disclosure scope involved in the present disclosure is not limited to the technical solution formed by the specific combination of the above features, but also encompasses another technical solution formed by an arbitrary combination of the above technical features or their equivalent features without departing from the above disclosure concepts. For example, it is a technical solution formed by replacing the above features with technical features having functions similar to the disclosed (but not limited to) in the present disclosure.

In the description provided herein, numerous specific details are set forth. However, it is understood that the embodiments of this invention can be practiced without these specific details. In other cases, well-known methods, structures and techniques have not been presented in detail in order not to obscure an understanding of this description.

Furthermore, while operations are depicted in a specific order, this should not be understood as requiring that such operations be performed in the specific order shown or in a sequential order. Under certain circumstances, multitasking and parallel processing can be advantageous. Similarly, while several specific implementation details are comprised in the above discussion, these should not be construed as limitations on the scope of the present disclosure. Certain features that are described in the context of separate embodiments can also be implemented in combination in a single embodiment. Conversely, various features that are described in the context of a single embodiment can also be implemented in multiple embodiments separately or in any suitable sub-combination.

Although some specific embodiments of the present disclosure have been described in detail by way of examples, it should be understood by those skilled in the art that the above examples are for illustration only and are not intended to limit the scope of the present disclosure. It should be appreciated by those skilled in the art that modifications can be made to the above embodiments without departing from the scope and spirit of the present disclosure. The scope of the present disclosure is defined by the attached claims.

What is claimed is:

1. A video processing method, comprising:
   providing a translator with a video to be translated according to a type of videos in which the translator is interested, and providing, in a video stream, the translator with an interactive interface for translating an original caption in the video, wherein the interactive interface comprises a translation of the original caption and an Edit option for the translation, the interactive interface comprising the Edit option is not provided to other users than the translator, the translator comprises a community translator or a non-community translator, for the community translator, the Edit option is always displayed, and for the non-community translator, the Edit option is displayed only a specified number of times as long as the translator does not click on the Edit option;
   entering a proofreading page in response to an operation of the translator on the Edit option for the translation;
   receiving a caption translation returned by the translator from the proofreading page; and
   displaying, in the video, a caption translation passing assessment.

2. The video processing method according to claim 1, wherein after the translator enters the proofreading page, playing the video is stopped, and an interface for editing the translation is provided.

3. The video processing method according to claim 2, wherein in response to the translator clicking on a designated area of the original caption, a corresponding speech is played.

4. The video processing method according to claim 2, wherein the video is played in synchronization with the caption in response to a playing request of the translator for the video.

5. The video processing method according to claim 4, wherein translations of a plurality of captions are displayed, and original captions and translations thereof are synchronously highlighted one by one corresponding to progress of the video.

6. The video processing method according to claim 2, wherein after the translator enters the proofreading page, translations of a plurality of captions are displayed, and the translations of the captions are highlighted one by one.

7. The video processing method according to claim 6, wherein in response to the translator clicking on any location of the translation, a corresponding location of the video is positioned and the interface for editing the translation is provided.

8. The video processing method according to claim 1, wherein the providing a translator with a video to be translated, and providing, in a video stream, the translator with an interactive interface for translating an original caption in the video comprises:
   providing the translator with a translation management interface, the translation management interface having thereon displayed a thumbnail of the video to be translated, on which an option of editing the translation is provided.

9. The video processing method according to claim 8, wherein the providing a translator with a video to be translated, and providing, in a video stream, the translator with an interactive interface for translating an original caption in the video comprises:
   in response to a preview request of the translator for the video to be translated, entering a preview page, on which the video is played and the translation of the caption is displayed, and the option of editing the translation is provided.

10. The video processing method according to claim 1, wherein the translator is provided with the video to be translated according to the type of videos in which the translator is interested, and a language used by the translator on a social network.

11. The video processing method according to claim 1, wherein the displaying, in the video, a caption translation passing assessment comprises:

displaying, in the video, a signature of the translator corresponding to the caption translation.

12. The video processing method according to claim 1, further comprising:

sending a notification to the translator after the caption translation of the translator passes assessment; and/or providing, in the video, with the translator an interactive interface for interaction with a viewer.

13. A video processing apparatus, comprising:

a memory; and a processor coupled to the memory, the processor being configured to perform, based on instructions stored in the memory, the video processing method according to claim 1.

14. A non-transitory computer-readable storage medium having thereon stored a computer program which, when executed by a processor, implements the video processing method according to claim 1.

15. A video processing apparatus, comprising:

a processor configured to provide a translator with a video to be translated according to a type of videos in which the translator is interested, and provide, in a video stream, the translator with an interactive interface for translating an original caption in the video, wherein the interactive interface comprises a translation of the original caption and an Edit option for the translation, the interactive interface comprising the Edit option is not provided to other users than the translator, the translator comprises a community translator or a non-community translator, for the community translator, the Edit option is always displayed, and for the non-community translator, the Edit option is displayed only a specified number of times as long as the translator does not click on the Edit option;

enter a proofreading page in response to an operation of the translator on the Edit option for the translation; and receive a caption translation returned by the translator from the proofreading page; and a display configured to display, in the video, a caption translation passing assessment.

16. The video processing apparatus according to claim 15, wherein the processor is configured to stop playing the video after the translator enters the proofreading page, and provide an interface for editing the translation.

17. The video processing apparatus according to claim 16, wherein the processor is configured to, in response to the translator clicking on a designated area of the original caption, play a corresponding speech.

18. The video processing apparatus according to claim 16, wherein the processor is configured to play the video is in synchronization with the caption in response to a playing request of the translator for the video.

19. The video processing apparatus according to claim 15, wherein the processor is configured to provide the translator with a translation management interface, the translation management interface having thereon displayed a thumbnail of the video to be translated, on which an option of editing the translation is provided.

* * * * *